(12) United States Patent
Fu et al.

(10) Patent No.: US 9,262,568 B2
(45) Date of Patent: Feb. 16, 2016

(54) DUMMY PATTERN PERFORMANCE AWARE ANALYSIS AND IMPLEMENTATION

(75) Inventors: Chung-Min Fu, Chungli (TW); Meng-Fu You, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 648 days.

(21) Appl. No.: 12/763,889

(22) Filed: Apr. 20, 2010

(65) Prior Publication Data
US 2011/0016443 A1 Jan. 20, 2011

Related U.S. Application Data

(60) Provisional application No. 61/226,103, filed on Jul. 16, 2009.

(51) Int. Cl.
*G06F 17/50* (2006.01)

(52) U.S. Cl.
CPC ........ *G06F 17/5068* (2013.01); *G06F 17/5031* (2013.01); *G06F 17/5081* (2013.01); *G06F 2217/12* (2013.01)

(58) Field of Classification Search
CPC ............ G06F 17/5068; G06F 2217/12; G06F 17/5072; G06F 12/5081; G06F 12/5077
See application file for complete search history.

(56) References Cited

U.S. PATENT DOCUMENTS

| | | | |
|---|---|---|---|
| 7,152,215 B2 * | 12/2006 | Smith et al. | 716/52 |
| 7,240,314 B1 * | 7/2007 | Leung | 257/773 |
| 7,509,622 B2 * | 3/2009 | Sinha et al. | 716/50 |
| 7,574,685 B1 * | 8/2009 | Dong et al. | 716/118 |
| 7,861,203 B2 * | 12/2010 | White et al. | 716/129 |
| 7,865,858 B2 * | 1/2011 | Vuong et al. | 716/126 |
| 8,024,673 B2 * | 9/2011 | Nitta | 716/50 |
| 8,108,814 B2 * | 1/2012 | Nitta | 716/108 |
| 8,307,321 B2 * | 11/2012 | Liu et al. | 716/122 |
| 2005/0144579 A1 * | 6/2005 | Lee | 716/5 |
| 2005/0205961 A1 * | 9/2005 | Doong | 257/499 |
| 2007/0234265 A1 * | 10/2007 | Vuong et al. | 716/12 |
| 2007/0256039 A1 * | 11/2007 | White | 716/4 |
| 2008/0148212 A1 * | 6/2008 | Vuong et al. | 716/11 |
| 2008/0163150 A1 * | 7/2008 | White et al. | 716/12 |
| 2009/0031261 A1 * | 1/2009 | Smith et al. | 716/2 |
| 2010/0229139 A1 * | 9/2010 | Kitaoka et al. | 716/6 |
| 2010/0242008 A1 * | 9/2010 | Liu et al. | 716/6 |
| 2011/0049721 A1 * | 3/2011 | Koti et al. | 257/773 |

* cited by examiner

*Primary Examiner* — A. M. Thompson
(74) *Attorney, Agent, or Firm* — Slater & Matsil, L.L.P.

(57) ABSTRACT

Embodiments of the present invention are a system, a computer program product, and a method for implementing an integrated circuit design. The method for implementing an integrated circuit design includes accessing an original electronic representation of an integrated circuit layout from a first user file, and accessing a defined sensitivity index that characterizes an impact of the dummy pattern on the functional component. The impact of the dummy pattern on the functional component is analyzed and it is determined whether the impact is within a limit of the sensitivity index. One of a plurality of features of the dummy pattern is adjusted if the impact is not within the limit to form a generated electronic representation of a modified integrated circuit layout, and the generated electronic representation is output to a second user file. The integrated circuit layout includes a dummy pattern and a functional component.

19 Claims, 5 Drawing Sheets

DUMMY PATTERN PERFORMANCE AWARE ANALYSIS AND IMPLEMENTATION

This application claims the benefit of U.S. Provisional Patent Application Ser. No. 61/226,103, filed on Jul. 16, 2009, and entitled "Dummy Pattern Performance Aware Analysis and Implementation," which application is incorporated herein by reference.

TECHNICAL FIELD

The present invention relates generally to a system, a computer program product, and method for integrated circuit analysis and implementation, and more particularly to a system, a computer program product, and method that is aware of the performance impact of a dummy pattern on the integrated circuit.

BACKGROUND

Generally, dummy patterns are inserted into integrated circuit designs to fulfill some design rules. One possible design rule may be to have each layer within the semiconductor device be as uniform as possible to reduce process variations, such as from lithography, etching, chemical mechanical polishing (CMP), or others. For example, dummy active areas may be inserted into a semiconductor material to create more uniform density of active areas in the semiconductor material. Likewise, dummy metal may be inserted into metal layers to cause the metal layers to have a more uniform density. Other dummy patterns may also include cell patterns, polysilicon patterns, or via patterns. Another possible design rule could link the integrated circuit design with a process model for better physical accuracy of the finished device. For example, the rule could require CMP-aware dummy metal insertion for a better physical thickness of the layer.

Designs are typically analyzed for electrical performance of the functional aspects of the integrated circuit using different electronic design automation (EDA) tools. Generally, a rule-based or physical-based dummy insertion is performed by an implementation tool; however, the electrical impact of the dummy pattern on functional components is not considered during this process. Accordingly, generally after the dummy pattern insertion, the performance of functional components are analyzed. Then, interactions of revisions of dummy patterns and re-analysis is generally necessary during the design implementation for optimal device functionality, which can lengthen the design process. Therefore, there is a need in the art to have performance-aware dummy pattern insertion in an integrated circuit.

SUMMARY OF THE INVENTION

These and other problems are generally solved or circumvented, and technical advantages are generally achieved, by embodiments of the present invention.

In accordance with an embodiment of the present invention, an integrated circuit design implementation system comprises a processor that accesses an electronic representation of a layout of an integrated circuit, a defined sensitivity index that characterizes an impact of the dummy pattern on the functional component, an evaluation tool to analyze the impact of the dummy pattern on the functional component, and an adjustment tool to adjust a feature of the dummy pattern when the impact exceeds a limit of the defined sensitivity index. The layout comprises a dummy pattern and a functional component.

Another embodiment of the present invention is a computer program product for providing an adjusted electronic representation of an integrated circuit layout. The computer program product has a medium with a computer program embodied thereon. The computer program comprises computer program code for accessing an original electronic representation of the integrated circuit layout, computer program code for defining a sensitivity index that characterizes an impact of the dummy pattern on the functional component, computer program code for analyzing the impact of the dummy pattern on the functional component, and computer program code for adjusting one of a plurality of features of the dummy pattern to cause the impact to be within a limit of the sensitivity index. The integrated circuit layout comprises a dummy pattern and a functional component.

Another embodiment of the present invention is a method for implementing an integrated circuit design. The method comprises accessing an original electronic representation of an integrated circuit layout from a first user file, accessing a defined sensitivity index that characterizes an impact of the dummy pattern on the functional component, analyzing the impact of the dummy pattern on the functional component, determining whether the impact is within a limit of the sensitivity index, adjusting one of a plurality of features of the dummy pattern if the impact is not within the limit to form a generated electronic representation of a modified integrated circuit layout, and outputting the generated electronic representation to a second user file. The integrated circuit layout comprises a dummy pattern and a functional component.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the present embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely an electronic design automation program (EDA) that is performance aware of impacts of dummy patterns on functional components in an integrated circuit. However, embodiments of the present invention are not limited to an EDA.

Figure 1:
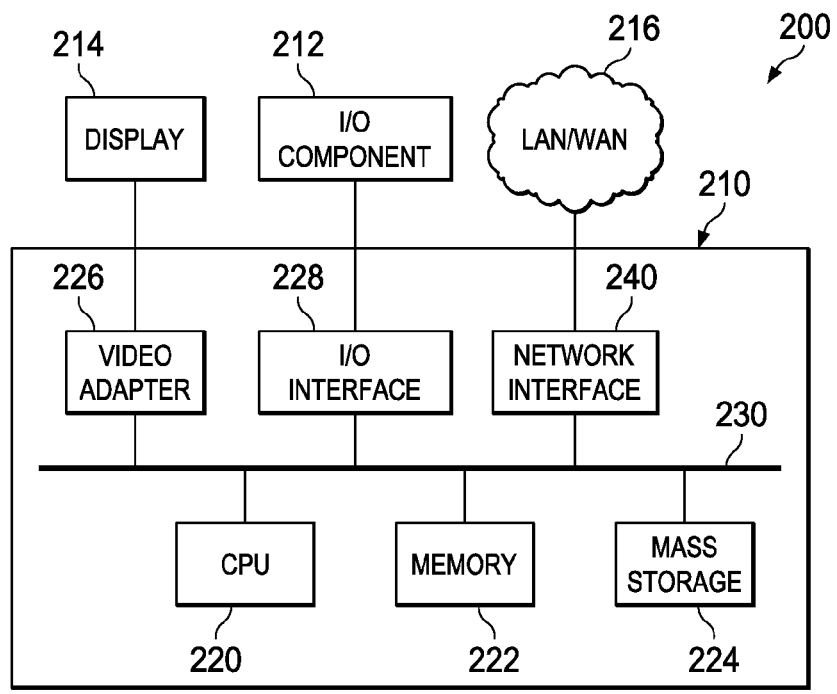
FIG. 1 is a block diagram of a processing system in accordance with an embodiment of the present invention.

Referring now to FIG. 1, a block diagram of a processing system 200 is provided in accordance with an embodiment of the present invention. The processing system 200 is a general purpose computer platform and may be used to implement any or all of the processes discussed herein. The processing system 200 may comprise a processing unit 210, such as a desktop computer, a workstation, a laptop computer, or a dedicated unit customized for a particular application. The processing system 200 may be equipped with a display 214 and one or more input/output devices 212, such as a mouse, a keyboard, or printer. The processing unit 210 may include a central processing unit (CPU) 220, memory 222, a mass storage device 224, a video adapter 226, and an I/O interface 228 connected to a bus 230.

The bus 230 may be one or more of any type of several bus architectures including a memory bus or memory controller, a peripheral bus, or video bus. The CPU 220 may comprise any type of electronic data processor, and the memory 222 may comprise any type of system memory, such as static random access memory (SRAM), dynamic random access memory (DRAM), or read-only memory (ROM).

The mass storage device 224 may comprise any type of storage device configured to store data, programs, and other information and to make the data, programs, and other information accessible via the bus 230. The mass storage device 224 may comprise, for example, one or more of a hard disk drive, a magnetic disk drive, or an optical disk drive.

The video adapter 226 and the I/O interface 228 provide interfaces to couple external input and output devices to the processing unit 210. As illustrated in FIG. 1, examples of input and output devices include the display 214 coupled to the video adapter 226 and the I/O device 212, such as a mouse, keyboard, printer, and the like, coupled to the I/O interface 228. Other devices may be coupled to the processing unit 210, and additional or fewer interface cards may be utilized. For example, a serial interface card (not shown) may be used to provide a serial interface for a printer. The processing unit 210 also may include a network interface 240 that may be a wired link to a local area network (LAN) or a wide area network (WAN) 216 and/or a wireless link.

It should be noted that the processing system 200 may include other components. For example, the processing system 200 may include power supplies, cables, a motherboard, removable storage media, cases, and the like. These other components, although not shown, are considered part of the processing system 200.

In an embodiment of the present invention, an EDA is program code that is executed by the CPU 220 to analyze a user file representing an integrated circuit layout. Further, during the execution of the EDA, the EDA may analyze functional components of the layout, as is known in the art. The program code may be accessed by the CPU 220 via the bus 230 from the memory 222, mass storage 224, or the like, or remotely through the network interface 240.

In an embodiment of the present invention, a sensitivity index is defined relative to the electrical impact of dummy patterns on functional components. The sensitivity index can take into account the electrical and physical properties of dummy patterns and the functional components. For example, changes in capacitance and resistance could adversely affect the speed of operation of the functional components, and thus, the sensitivity index could include considerations of changes in capacitance and resistance caused by inserting dummy patterns to create a timing sensitivity index. Further, the sensitivity index may be defined by calculations based on the spacing between components, the physical properties of the components, and the dimensions of all of the components, such as the widths, thicknesses, and lengths. These calculations, along with their intricacies, are well known in the art.

The sensitivity index definition can be saved in the memory 222 or mass storage 224 of the processing system 210 or may be input by a user through the I/O interface 228 or by a remote user through the connection to the network interface 240. In the latter case, the sensitivity index definition may be saved in the memory 222 during execution of the EDA. During each of these instances, the CPU 220 executing an EDA will access the sensitivity index definition by the bus 230.

An electronic user file representing a layout of an integrated circuit to be analyzed is loaded onto the processing system 210. The methods of how an electronic user file may represent such a layout are known in the art, but the user file generally comprises computer program code that represents properties of a physical layout, for example by mathematical models. The loading onto the processing system 210 can be done by uploading the user file through the I/O interface 228, such as by a user creating the file while the EDA is executing. Alternatively, the user file may be uploaded and/or saved on the memory 222 or mass storage 224. Also, the user file may be uploaded through the network interface 240 from a remote user. In these instances, the CPU 220 will access the user file during execution of the EDA.

Figure 2:
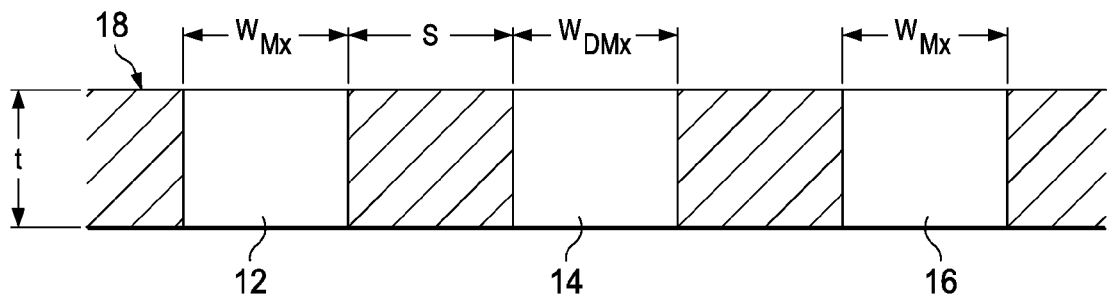
FIG. 2 is a cross sectional view of a simplified metallization layer with a dummy metal that may be represented in an electronic user file.
Figure 3:
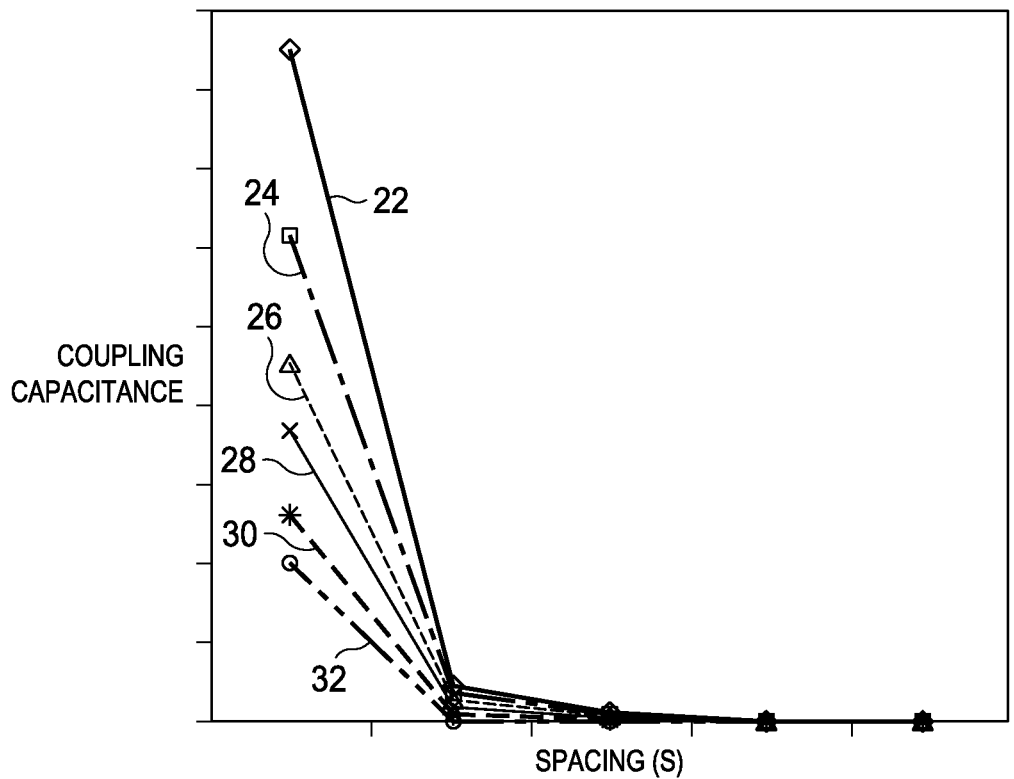
FIG. 3 is an exemplary sensitivity index for FIG. 2 based on differing spacing and dummy pattern width values in accordance with an embodiment of the present invention.

FIG. 2 illustrates a cross sectional view of a simplified metallization layer with a dummy metal that may be represented in an electronic user file. The figure includes functional metals 12 and 16 and a dummy metal 14 disposed in a dielectric layer 18. Many other features may be included in a metallization layer, such as diffusion barriers, but those features are omitted in FIG. 2 and subsequent figures for simplicity and clarity. The widths of the functional metals 12 and 16 are labeled $W_{Mx}$. The width of the dummy metal 14 is labeled $W_{DMx}$. The thickness of the dielectric layer and the metals is t. The spacing between the functional metal 12 and the dummy metal 14 is labeled S. As is known in the art, the dummy metal 14 increases the coupling capacitance between the functional metals 12 and 16 from the capacitance that would otherwise exist without the dummy metal 14. FIG. 3 illustrates an exemplary sensitivity index for FIG. 2 based on differing S and $W_{DMx}$ values. The y-axis represents the coupling capacitance between functional metals 12 and 16, and the x-axis represents different spacing values for S. The different functions correspond to different dummy metal 14 widths $W_{DMx}$. Function 22 considers a smaller width $W_{DMx}$ than function 24, and so on for functions 26, 28, 30, and 32.

During the EDA execution, limits on the sensitivity index will be honored by EDAs. An EDA would thus be aware of the impact of dummy patterns on the functional components. The user file may be changed to alter a feature or features of the dummy patterns until the impact of the dummy patterns fall below the limits on the sensitivity index. If the EDA is unable to change the features such that the impact falls below the limits, the EDA may change the user file to completely remove a specific dummy pattern to eliminate any impact that the dummy pattern would have on functional components. At the conclusion of the EDA analysis, the EDA will generate another user file that represents the altered layout. This generated user file may be a new user file such that the original user file remains unchanged, or the generated user file may overwrite the original user file such that the original user file does not exist afterwards. This generated user file may be saved in the memory 222 or mass storage 224 or output through the I/O interface 228 or the network interface 240 to a remote user.

Figure 4:
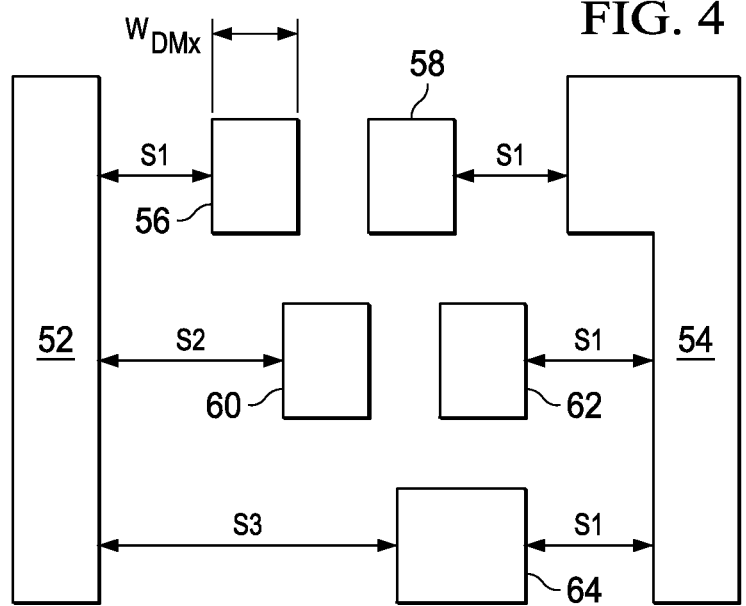
FIG. 4 is an exemplary layout view of a simplified metallization layer with a dummy metal that may be represented in an electronic user file.

An example of this process is explained with reference to FIG. 4. FIG. 4 illustrates a layout view of a metallization layer. The layer includes critical functional metal 52, non-critical functional metal 54, and dummy metals 56, 58, 60, 62, and 64. Initially, a designer may create a user file representing the layout in compliance with all design rules, including density uniformity rules. Then, after loading the user file onto the processing unit 210, the CPU 220 will execute the EDA analysis and implementation of the user file representing the layout. In this example, the sensitivity index for the layout is a timing sensitivity index that is defined by a mathematical model that determines the RC constant created by the dummy metals with respect to critical functional components. The timing sensitivity index will help ensure that the operating speed of critical components is within an acceptable range. However, speed of the non-critical components, like non-critical functional metal 54, is not important, and the EDA will not analyze the impact of the dummy metal on the non-critical components. Accordingly, the spacing between the dummy metals 58, 62, and 64 and the non-critical metal 54 need not be analyzed, but will meet the initial design rules for uniformity such that the minimum spacing S1 is between the dummy metals 58, 62, and 64 and the non-critical metal 54. In some embodiments, minimum spacing may be a sensitivity index value.

The limit on the timing sensitivity index in this example is that the dummy metals 56, 58, 60, 62, and 64 each cannot impact the RC timing constant 5 percent or more, or in other words, the impact on the RC timing constant must be under 5 percent. The EDA uses a loop to analyze these impacts. During each iteration of the loop, the EDA may isolate and analyze a single dummy pattern or may analyze all of the dummy patterns together. During an iteration, the EDA first uses the timing sensitivity index to determine the impact of particular dummy patterns. Then, the EDA will determine if that impact is within the limit, within 5 percent in this example. If the EDA determines that the impact is acceptable, the EDA will move on to another dummy pattern or will conclude. However, if the impact is not acceptable, the EDA will change the user file to alter features of the specific dummy pattern being analyzed. Once the dummy pattern is altered, the loop will run another iteration. If subsequent iterations continue to alter the pattern without success, the EDA may completely eliminate the dummy pattern from the layout.

In the layout in FIG. 4 in accordance with this example, dummy metal 56 violates the limit on the timing sensitivity index. Accordingly, in a first iteration, the dummy metal 56 width $W_{DMx}$ or spacing S1, or other features of the metallization layer, may be altered. In subsequent iterations, these alterations do not lead to a successful impact, and the EDA eliminates dummy metal 56 from the layout. However, dummy metal 60 with spacing S2 and dummy metal 64 with spacing S3 do not violate the limits. Further, dummy metals 58 and 62 do not violate the limits. The EDA will then terminate and generate a user file of a layout that has successful functional components with dummy patterns that do not violate the timing sensitivity index limits.

Figure 5:
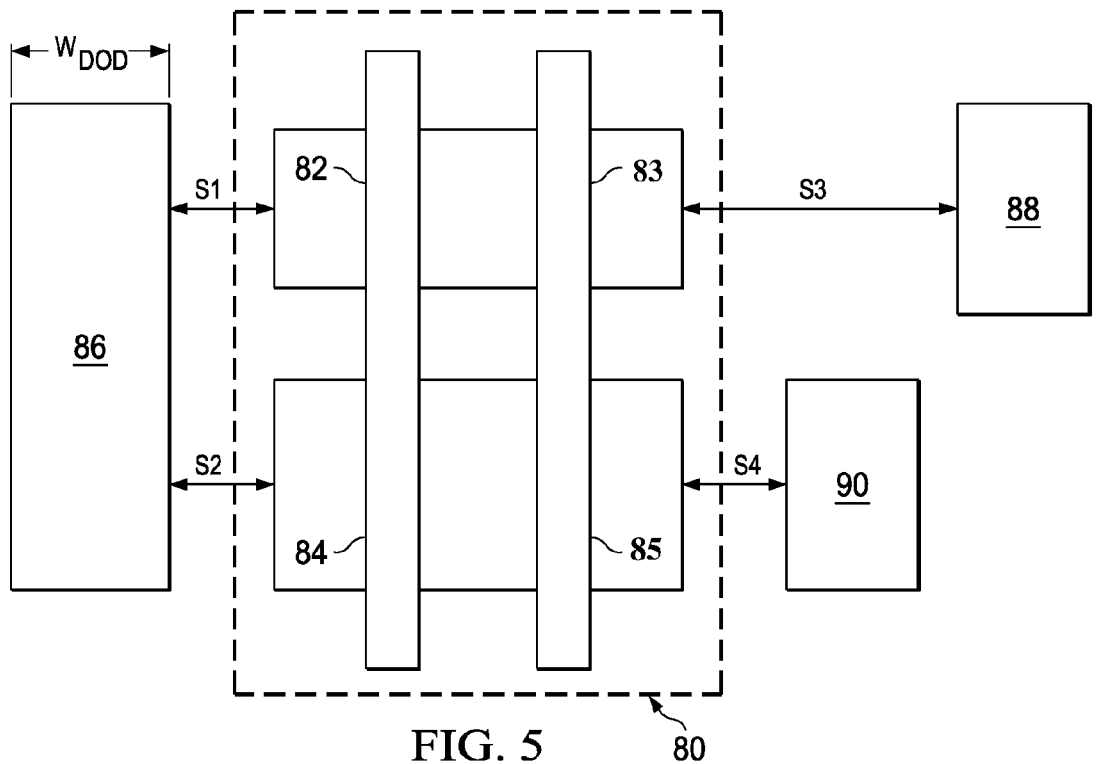
FIG. 5 is an exemplary layout of a target cell that comprises two NMOS transistors, two PMOS transistors, and dummy active areas that may be represented in an electronic user file.

Another exemplary embodiment will be discussed with reference to FIGS. 5 and 6. FIG. 5 is a layout of a target cell 80 that comprises two NMOS transistors 82 and 83 and two PMOS transistors 84 and 85. The target cell 80 has adjacent dummy active area 86 with spacing S1 from the NMOS 82 and 83 active area and with spacing S2 from the PMOS 84 and 85 active area. The target cell 80 also has adjacent dummy active area 88 with spacing S3 from the NMOS 82 and 83 active area and dummy active area 90 with spacing S4 from the PMOS 84 and 85 active area. The width of dummy active area 86 is $W_{DOD}$.

The sensitivity index in this example may be a model of the $I_{sat}$ or $V_t$ of the transistors in the target cell 80 based in part on the dummy active area sizes and spacing or the NMOS 82 and 83 and PMOS 84 and 85 transistor dependence due to cell-proximity effects, such as stresses and active area spacing. Just like above, a designer would initially create a user file of the layout, and then an EDA would analyze it based on limitations of the sensitivity index. The EDA could alter the sizes or spacing of the dummy active areas to provide a layout that is within the acceptable limits of the sensitivity index just as discussed above. Further, the EDA could insert dummy active areas to provide a higher performance layout.

Figure 6:
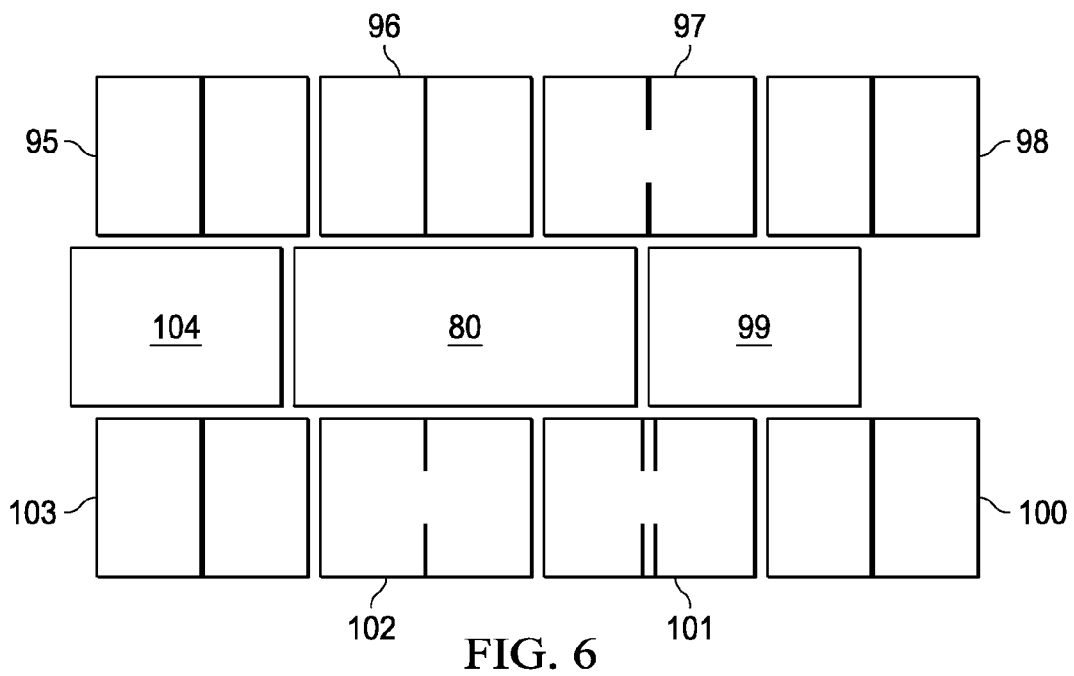
FIG. 6 is an exemplary layout of a target cell surrounded by dummy cells that may be represented in an electronic user file.

FIG. 6 illustrates a layout of a target cell 80 surrounded by dummy cells 95 through 104. Similar to what is discussed above with reference to FIG. 5, the target cell is analyzed with respect to pairs of isolated dummy cells. For dummy cells 95 through 98, each dummy cell will be paired with a dummy cell opposite the target cell with respect to the longitudinal axis. For example, dummy cell 95 is paired with dummy cell 103; dummy cell 96 is paired with dummy cell 102; and so on. Also, dummy cell 99 is paired with dummy cell 104. Each pair is analyzed and possibly adjusted or eliminated such that the impact of each dummy cell is within one or more limits on the sensitivity index.

Figure 7:
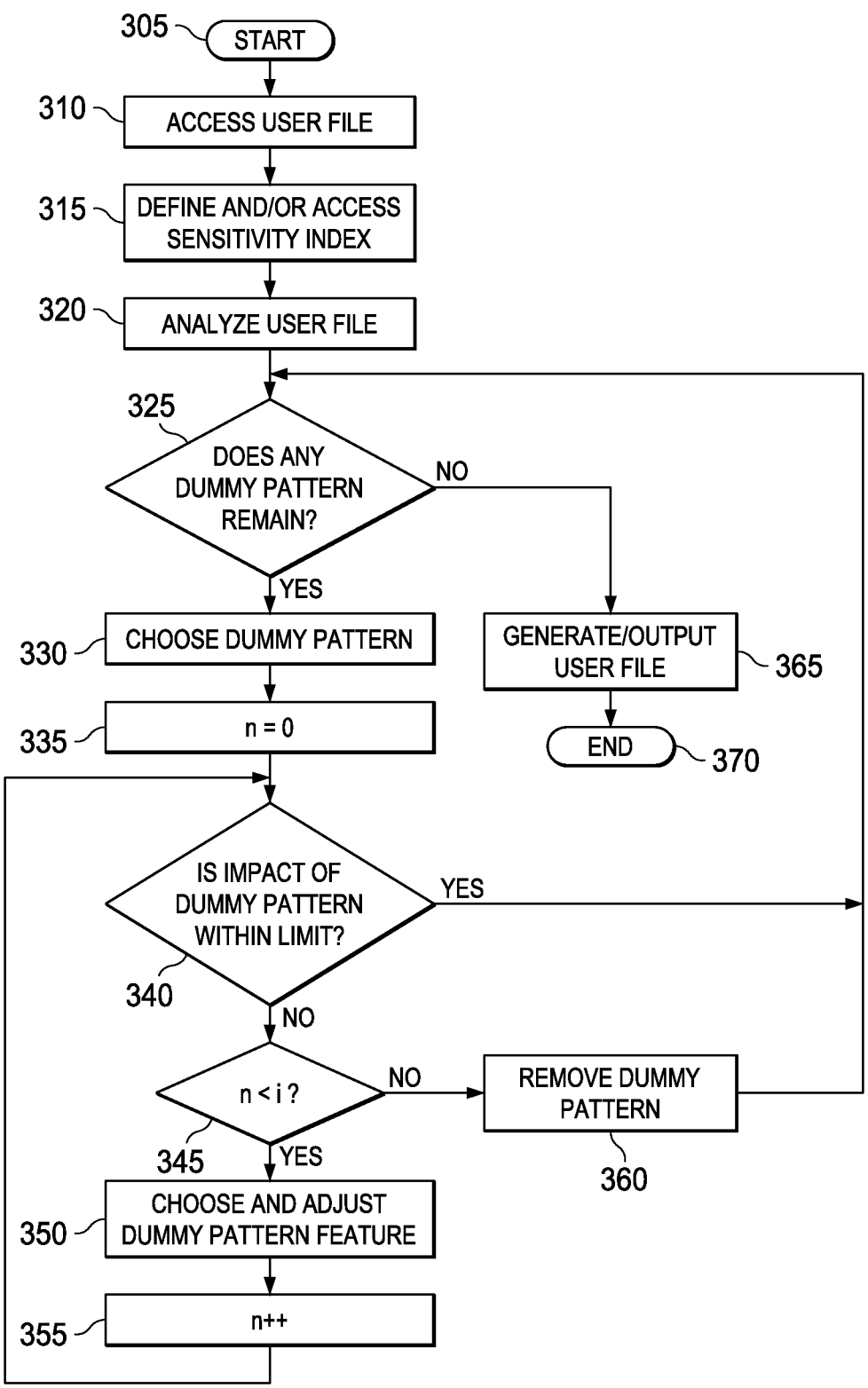
FIG. 7 is a flowchart of a process to choose a dummy pattern that exists in a layout that is represented by a user file and to adjust and possibly remove that dummy pattern in accordance with an embodiment of the present invention.
Figure 8:
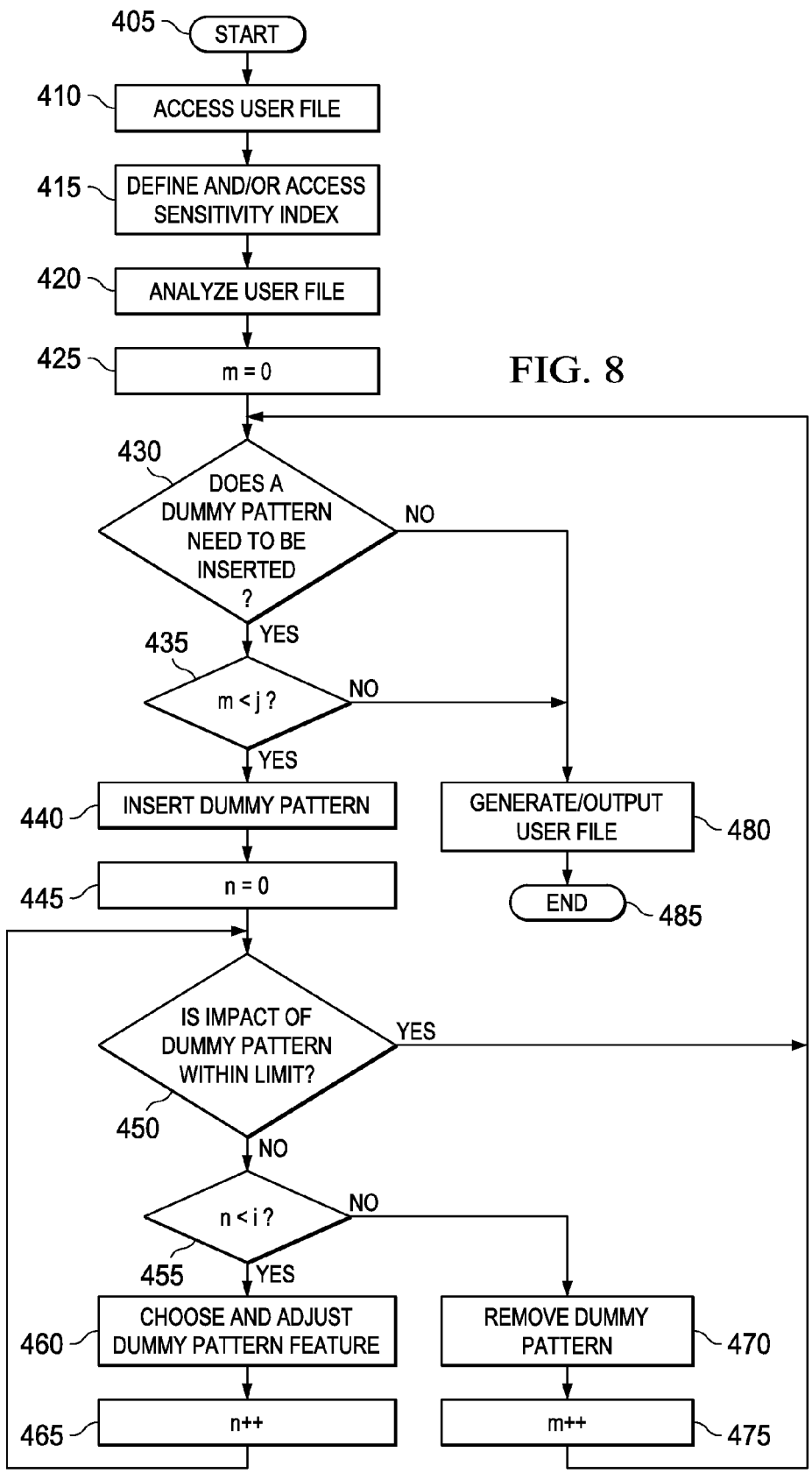
FIG. 8 is a flowchart of a process to determine when a dummy pattern needs to be added to a layout that is represented by a user file and to insert that dummy pattern in accordance with an embodiment of the present invention.

FIGS. 7 and 8 illustrate simplified flowcharts of the operation of an EDA in accordance with embodiments of the invention. While the flowcharts show separate functions, components from each may be combined to form an operation that contains both functionalities.

FIG. 7 shows a flowchart that exemplifies a process to choose a dummy pattern that exists in a layout that is represented by a user file and to adjust and possibly remove that dummy pattern. After the program starts 305, the user file is accessed 310 as previously discussed. Then, the sensitivity index is defined and/or accessed 315 depending on how the sensitivity index is provided or stored. Next, the user file is analyzed 320. If the impact of each dummy pattern has not been analyzed such that some dummy patterns remain 325, one of the remaining dummy patterns is chosen 330. Then, a counter is initiated 335. If the impact of the dummy pattern is within a limit of the sensitivity index 340, the program continues back to determine if the impact of each dummy pattern has not been analyzed 325. If the impact of the dummy pattern is not within the limit 340, the program determines whether the counter is less than a fixed index 345. If the counter is less than the index 345, a feature of the dummy pattern to be adjusted is chosen and adjusted 350, and the counter is incremented by one 355. The program then returns to determine if the impact of the dummy pattern, with its adjustments, is within the limit 340.

If the counter is not less than the index 345, the dummy pattern is removed 360. The program then returns to determine whether the impact of each dummy pattern has been analyzed 325. If all of the dummy patterns have been analyzed such that none remain 325, a user file is generated and output 365. The program then ends 370.

This embodiment analyzes each dummy pattern separately, but other embodiments contemplate analyzing all of the dummy patterns simultaneously. Further, this embodiment uses a simple counter with some defined index as a means to prevent an infinite loop from occurring by continuously adjusting a dummy pattern when no adjustment will produce a dummy pattern that is within the limit. When the counter reaches the index, the dummy pattern is simply removed from the layout. Other conditions may be used to prevent the loop from becoming infinite, such as when all possible features that can be adjusted have been adjusted but are still unsatisfactory.

FIG. 8 shows a flowchart that exemplifies a process to determine when a dummy pattern needs to be added to a layout that is represented by a user file and to insert that dummy pattern in a manner that honors a sensitivity index. After the program starts 405, the user file is accessed 410 as previously discussed. Then, the sensitivity index is defined and/or accessed 415 depending on how the sensitivity index is provided or stored. Next, the user file is analyzed 420, and a first counter is initiated 425. Then, the program will determine if a dummy pattern needs to be inserted 430. If so, the program determines if the first counter is less than a first index 435. If so, a dummy pattern is inserted 440, and a second counter is initiated 445. Then, if the impact of the dummy pattern is within a limit of the sensitivity index 450, the program continues back to determine if another dummy pattern needs to be inserted 430. If the impact of the dummy pattern is not within the limit 450, the program determines whether the second counter is less than a second index 455. If the second counter is less than the second index 455, a feature of the dummy pattern to be adjusted is chosen and adjusted 460, and the second counter is incremented by one 465. The program then returns to determine if the impact of the dummy pattern, with its adjustments, is within the limit 450.

If the second counter is not less than the second index 455, the dummy pattern is removed 470, and the first index is incremented 475. The program then returns to determine whether a dummy pattern needs to be inserted 430. If a dummy pattern does not need to be inserted 430 or if the first counter is not less than the first index 435, a user file is generated and output 480. The program then ends 485.

This embodiment inserts a dummy pattern individually and analyzes it, but other embodiments contemplate inserting multiple dummy patterns and analyzing them all simultaneously or individually. Further, this embodiment uses simple counters, the first and second counter, with some defined indexes as a means to prevent infinite loops from occurring by continuously adjusting an inserted dummy pattern when no adjustment will produce a dummy pattern that is within the limit or by continuously inserting a dummy pattern when no inserted dummy pattern will produce a desired result. When the second counter reaches the second index, the inserted dummy pattern is simply removed from the layout. If that continues, the first counter continues to increase when multiple dummy patterns are inserted and subsequently removed. Once the first counter reaches the first index, the program ends. Other conditions may be used to prevent the loops from becoming infinite, such as when all possible features that can be adjusted have been adjusted or if all possible combinations of dummy features have been inserted but are still unsatisfactory.

Further embodiments contemplate that after obtaining a user file representing a layout, an integrated circuit may be processed and formed as represented in the layout. Such processes are known in the art. A photomask or many photomasks may be formed as indicated by the layout to process a semiconductor wafer to form the integrated circuit in the manner indicated by the layout. The processing may include processes such as forming isolation oxides by local oxidation of silicon (LOCOS) or other shallow trench isolation (STI) processes, ion implantation, and forming additional layers on the semiconductor wafer like additional dielectric layers, polysilicon layer, metal layers, and the like. Further, the processing may also include etching any layer or layers to form the structures as indicated in the final layout.

Many advantages may be obtained by embodiments of the invention. The sensitivity index of the dummy features, such as for active areas, metal layers, polysilicon gates, vias, or cells, allows an EDA to measure and analyze the impact of the dummy patterns on functional components of the integrated circuit. The EDA is then capable of adjusting the dummy patterns as necessary to increase the quality of the integrated circuit. Further, because this is done during the implementation on an EDA, the design turnaround time is reduced, and on-the-fly design changes are eliminated reducing rework effort. Further, embodiments could easily be used in either the automatic place-and-route (APR) digital design flow or the GDS utility stage for custom designs.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, specifically EDAs. Although embodiments of the invention have been thoroughly discussed with regard to EDAs, the invention is not so limited. Other embodiments contemplate the used of databases, scripts, or other equivalent computer programs.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated circuit design implementation system comprising:
   a processor that accesses an electronic representation of a layout of an integrated circuit, wherein the layout comprises a dummy pattern having a first spacing from a functional component, wherein the dummy pattern has a first size;
   a defined sensitivity index that characterizes an impact of the dummy pattern on the functional component;
   an evaluation tool to analyze the impact of the dummy pattern on the functional component; and
   an adjustment tool to adjust at least one of the first spacing or the first size of the dummy pattern in the layout while the impact is not within a limit of the defined sensitivity index, wherein the adjustment tool removes the dummy pattern from the electronic representation of the layout when the number of adjustments to the dummy pattern exceeds a fixed index.

2. The integrated circuit design implementation system of claim 1, wherein the adjustment tool removes the dummy pattern from the electronic representation of the layout when the impact exceeds the limit of the defined sensitivity index.

3. The integrated circuit design implementation system of claim 1, wherein the defined sensitivity index is defined by a mathematical model that characterizes the impact based on some physical and electrical features of the dummy pattern and the functional component.

4. The integrated circuit design implementation system of claim 1, wherein the defined sensitivity index is a timing sensitivity index that characterizes a resistance-capacitance impact of the dummy pattern on the functional component.

5. The integrated circuit design implementation system of claim 1, wherein the defined sensitivity index characterizes the impact of the dummy pattern on a saturation current or threshold voltage of a functional transistor.

6. The integrated circuit design implementation system of claim 1, further comprising an output interface to output a generated electronic layout of the integrated circuit.

7. The integrated circuit design implementation system of claim 1, wherein the dummy pattern is a dummy metal, and the functional component is a functional metal, wherein both the dummy metal and the functional metal are in a metallization layer.

8. The integrated circuit design implementation system of claim 1, wherein the dummy pattern is a dummy active area, and the functional component is a functional transistor.

9. A computer program product for providing an adjusted electronic representation of an integrated circuit layout, the computer program product having a non-transitory medium with a computer program embodied thereon, the computer program product comprising:
   computer program code for accessing an original electronic representation of the integrated circuit layout from a storage medium, wherein the integrated circuit layout comprises a dummy pattern having a first spacing from a functional component;
   computer program code for defining a sensitivity index that characterizes an impact of the dummy pattern on the functional component;
   computer program code for analyzing the impact of the dummy pattern on the functional component;
   computer program code for adjusting at least one of a thickness, a size, or the first spacing of the dummy pattern in the integrated circuit layout to cause the impact to be within a limit of the defined sensitivity index;
   computer program code for looping to continuously analyze the impact and adjust some of the thickness, the size, or the first spacing while the impact is not within the limit of the defined sensitivity index; and
   computer program code for removing the dummy pattern when the number of adjustments to the dummy pattern exceeds a fixed index.

10. The computer program product of claim 9, further comprising computer program code for inserting a second dummy pattern into the integrated circuit layout.

11. The computer program product of claim 9, wherein the dummy pattern comprises a dummy metal, a dummy active area, a dummy via, or a dummy polysilicon gate, and wherein the functional component comprises a functional metal, a functional transistor, or a functional via.

12. The computer program product of claim 9, wherein the sensitivity index characterizes a resistance-capacitance impact, a saturation current impact, or a threshold voltage impact.

13. A method for implementing an integrated circuit design, the method comprising:
   accessing an original electronic representation of an integrated circuit layout from a first user file in a storage medium, wherein the integrated circuit layout comprises a dummy pattern and a functional component;
   accessing a defined sensitivity index that characterizes an impact of the dummy pattern on the functional component;
   analyzing the impact of the dummy pattern on the functional component;
   determining whether the impact is within a limit of the defined sensitivity index;
   using a processor, adjusting at least one of a size or a location of the dummy pattern in the integrated circuit layout while the impact is not within the limit of the defined sensitivity index to form a generated electronic representation of a modified integrated circuit layout;
   removing the dummy pattern from the integrated circuit layout when the number of adjustments to the dummy pattern exceeds a fixed index to form the generated electronic representation of the modified integrated circuit layout; and
   outputting the generated electronic representation to a second user file.

14. The method of claim 13, further comprising repeating the adjusting another of the size or the location while the impact is not within the limit of the defined sensitivity index.

15. The method of claim 13, wherein the adjusting comprises removing the dummy pattern.

16. The method of claim 13, further comprising inserting an additional dummy pattern.

17. The method of claim 13, wherein the dummy pattern comprises a dummy metal, a dummy active area, a dummy via, or a dummy polysilicon gate, and wherein the functional component comprises a functional metal, a functional transistor, or a functional via.

18. The method of claim 13, wherein the sensitivity index characterizes a resistance-capacitance impact, a saturation current impact, or a threshold voltage impact.

19. The method of claim 13, further comprising forming a semiconductor device embodying the modified integrated circuit layout.

* * * * *